United States Patent Office 3,185,172
Patented May 25, 1965

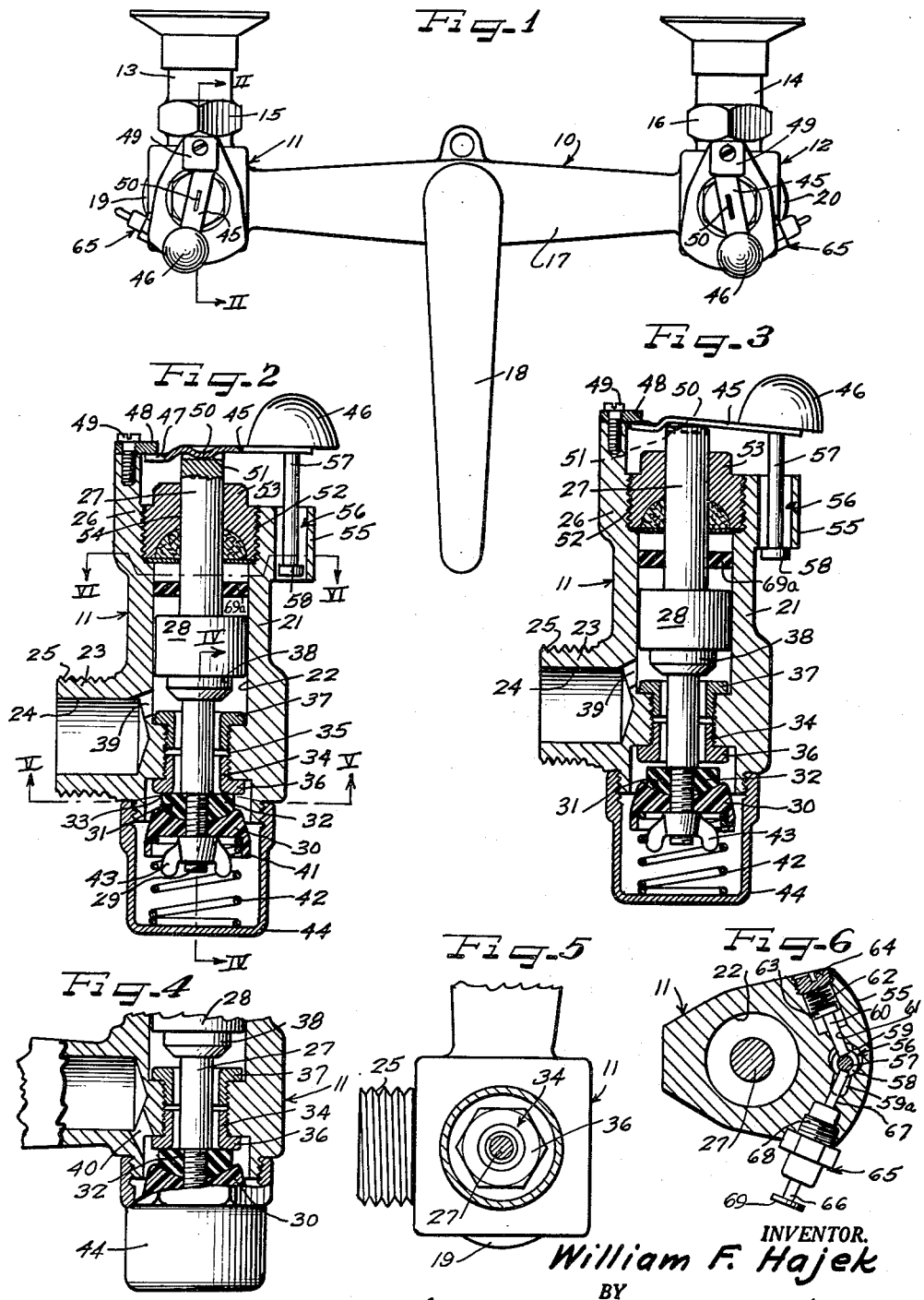

3,185,172
PUSH BUTTON FAUCET WITH ALTERNATELY
SEATING VALVES
William F. Hajek, 909 W. 20th Place, Chicago 8, Ill.
Filed Sept. 25, 1961, Ser. No. 140,480
3 Claims. (Cl. 137—315)

The present invention relates to valve means including faucets, spigots, cocks and similar items, and more particularly to a faucet of the type commonly used in homes and other buildings for sinks, washbowls, bathtubs, etc., although being adaptable for industrial use and in numerous other applications.

A major difficulty with previously available faucet constructions of which I am aware is the need for rotating the faucet handle to open or shut the faucet, which requires a particular effort and concentration on the part of the faucet user and often becomes difficult where the valve element has become worn away as a result of repeated relative rotation of the seat thereagainst, and subject to sticking. When the valve element is worn in this manner, a considerable degree of pressure is required to prevent leaking, and this in turn makes reopening of the faucet exceptionally difficult. Also it is burdensome to repair conventional faucets because the water must first be shut off in the line.

The present invention overcomes the aforementioned difficulties and objections by means of a push-button construction whereby the faucet may be opened with but slight pressure on a lever member therefor, and automatically retained open as long as desired. Closing of the faucet is readily accomplished by actuation of a push-button which permits the valve to return to closed position under spring pressure.

Accordingly, it is an object of the present invention to provide a faucet which eliminates the need for rotation of a valve element, and also the attendant difficulties experienced when the valve element for the rotatable faucet construction has become worn or subject to sticking.

Another object of the invention is to provide a construction as described which is exceptionally simple to operate, particularly since a push-button action readily releases the faucet to closed position after opening thereof.

Another object of the invention is to provide a device as described which may be set for any desired extent of faucet opening, and may include a plurality of different settings for this purpose if desired.

Another object of the invention is to provide a faucet as described which affords ready access to the valve element, and which can be repaired with no interference from water flow and without shutting of the main line.

Still another object of the invention is to provide a faucet construction which is simple, economical to manufacture and entirely reliable in use, as well as being much more desirable for the housewife or other user as a result of the simple and reliable action thereof.

Other objects and advantages of the invention will become apparent as the description proceeds in accordance with the drawings, in which:

FIGURE 1 is a top plan view of a faucet construction according to the present invention;

FIGURE 2 is a vertical sectional view taken along the lines II—II of FIGURE 1;

FIGURE 3 is a view corresponding to the view of FIGURE 2 but showing the faucet in open position;

FIGURE 4 is a vertical sectional view taken along the lines IV—IV of FIGURE 2;

FIGURE 5 is a horizontal sectional view taken along the line V—V of FIGURE 2; and FIGURE 6 is a horizontal sectional view taken along the lines VI—VI of FIGURE 2.

Referring now to the drawings, a faucet 10 is shown according to the present invention which, as illustrated provides a pair of faucet members 11 and 12 connected to conduits 13 and 14 which may be hot and cold water inlets, by suitable internally threaded nut elements 15 and 16 as understood by those skilled in the art. Also, a central outlet fitting 17 may be formed integrally with the faucet members 11 and 12, or releasably connected thereto by internally threaded nut elements (not shown). A spigot or outlet valve 18 is journalled on the fitting 17 for rotational adjustment in the conventional manner. The fittings 11 and 12 may be manufactured with an outlet opening instead of the bosses 19 and 20, for selective connection to either the right or left side thereof with the fitting 17, so that right and left castings are not required.

The invention is described with respect to the fitting 11 for convenience, and the fitting 11 in accordance with the invention, includes a valve body 21 having an axial bore 22 therethrough, an inlet extension 23 internally bored at 24 and externally threaded at 25, and a preferably integrally formed upstanding fulcrum boss 26. A valve stem 27 is mounted for axial movement in the bore 22, and is preferably provided with a guide boss 28 in slidable engagement with the bore 22.

In accordance with the invention, the lower portion of the valve stem 27 has a threaded extension 29 of reduced diameter on which is threaded a valve support member 30 which is concave along its upper face 31 for supporting a resilient valve 32 in releasable engagement with a lower valve seat end 33 of a valve seat insert 34 threaded in a reduced portion 35 of the central bore. The valve seat insert 34 has a hexagonal flange 36 so that a suitable configured tool can be used for disassembly as desired. A second valve seat insert 37 is similarly threaded in the bore portion 35, both the valve seat inserts having an internal diameter greater than the outer diameter of the stem to afford selective fluid flow. The upper valve seat insert provides a seat for a valve member 38 of resilient construction and which engages in abutting relation with the boss 28. Fluid may enter from the bore 24 through port 39 above the upper valve seat and pass through valve seat inserts to an outlet port 40, as controlled in accordance with the invention and as hereinafter further described.

The valve support member 30 is characterized by a depending skirt 41 and is biased or urged upwardly by a helical spring 42 which bears against the inner and lower surface of the member 30 as to urge the valve stem and valve members upwardly. The member 30 is preferably held in position by a wing nut 43 on the threaded end 29 of the valve stem. A cup-shaped spring support and cover member 44 is threaded onto a reduced portion of the body 21, in supporting relation to the spring 42. Because the spring 42 applies even, uniform pressure on the valve, wear is avoided. Thus, a child and an adult would generally apply differing pressures to the conventional valve, causing wear, but such problems are eliminated by the cup construction shown. It will be appreciated that ready access to the internal portions of the faucet 11 is therefore afforded without the need for special tools or the like and so that only slight manual effort is required. And repair is made simple because there is no need for a wrench or tools in obtaining removal of the valves. The wing nut 43 may be handled with a cloth or the like and the water shut off during repair as herewith described.

In order to afford actuation of the faucet 11, a manually operable lever 45 is pivoted in bearing relation with the upper end of the stem 27. The lever 45 may have a suitably rounded or otherwise configured cap member 46 on its outer end and at its inner end may be turned downwardly at 47. In any event, the inner end is fulcrumed against an overlying flange or ledge portion 48 secured on the fulcrum boss 26, which is removably secured thereto by a screw 49 to permit selective access to the packing for necessary repairs to the stuffing nut in case of replacement. In order to afford a secure pivotal mounting of the lever, in relation to the valve stem 27, the lever is formed centrally with a depending arcuate boss 50 extending axially thereof. Correspondingly, the valve stem 27 has a groove 51 therein receiving the arcuate surface if desired to facilitate pivotal movement of the lever with respect thereto. The upper end of the body 21 is internally threaded at an enlarged portion 52 thereof to threadedly engage a nut element or the like 53 having a central bore 54 slidably receiving the stem 27. The slot or groove 51 affords a cooperative action with the lever 45 and boss 50 to hold the stem against relative rotation during removal of the nut 43, in the manner of a screw driver when the nut must be loosened or replaced as described.

Further in accordance with the invention, the fitting 21 has a preferably integrally formed extension 55 defining a bore 56 with a preferably keyhole shaped cross-section as seen in FIGURE 6. The lever 45 carries a depending pin 57 at its outer end having a bottom stop 58 of wider diameter than the pin and adapted to fit slidably in proximate relation in the wider portion 59 of the bore 56. Further in accordance with the invention, a pin element 60 is slidably mounted transversely in a bore 61 in the extension 55 and is urged against the pin 57 by a spring 62 bearing against a head portion 63 of the pin 60. The opposite end of the spring 62 bears against a stop member 64 threaded into the extension as shown. In order to position the pin coaxially within the enlarged bore portion 59, as hereinafter further described, a push-button means 65 has a pin portion 66 slidably received in a bore 67 and a fitting 68 which may be threaded into the extension 55 as shown. The push-button means 65 may have a button end portion 69 for convenient actuation thereof.

In operation, the valve or faucet members 11 and 12 in their off-position are disposed as seen in FIGURE 2 with respect to the faucet member 12. Thus the valve element 32 is urged into abutting engagement with the valve seat portion 33 and prevents flow of fluid from the inlet port 39 to the outlet 40. However, and in accordance with the invention, a simple, reliable and quick acting opening movement is readily achieved by manually pressing the lever 45, preferably at the cap or button portion 46, so that the lever is caused to move downwardly against the action of the spring 42. The ledge 48 acts as a fulcrum for this purpose, and the boss 50 rocks readily in the groove 51 in accomplishing this downward movement of the valve stem. The valve element 32 is therefore moved away from the valve seat 33 to a sufficient extent to permit flow, the valve element 38 being spaced sufficiently from the valve element or member 32 in relation to the valve seat inserts to permit such flow.

When the faucet 11 is in the closed condition shown in FIGURE 2, the end stop 58 is received in the relatively wide bore portion 59 of the bore 56. Upon downward movement of the lever 45, however, the stop member 58 extends downwardly and outwardly of the extension 55 and therefore, the spring action of the spring 62 is effective to move the pin 57 laterally into the keyhole portion 59a of the bore 56 so that the stop 58, upon release of the lever 45, is brought upwardly into abutting engagement with the bottom of the extension 55 by the action of the spring 42, which urges the valve stem 27 against the lever 45. Thus, once the faucet is opened, it is automatically maintained in open position by the spring action described.

It may be noted that when the valve or faucet is open, leakage through the bore 22 is prevented by a sealing gasket or ring 69a. The member 69a is of an elastomeric material which has squeeze fit relation to the bore 22 and therefore is highly effective in preventing any leakage of fluid upwardly through the valve body.

Release of the faucet from open to closed position is similarly accomplished in an extremely simple manner, and in fact requires no effort in closing the valve. Thus, the push-button means 65 is actuated manually inwardly, as by a finger-tip action, and so that the pin 57 is moved out of the keyhole portion 59a into the main or enlarged portion 59 whereby the stop 58 is in coaxial registration with the bore portion 59. It is therefore no longer prevented from upward movement and the spring 42 acts through the valve stem 27 to urge the lever 45 and thus the pin 57 upwardly automatically to close the valve and bring the valve member or element 32 against the valve seat 33 with a desired force. It will be appreciated that no grinding of the valve element is provided by the construction herein set forth, since no rotation of the part is required, and further, no sticking such as is encountered with previously available construction is developed. The entire operation is extremely simple and reliable so that the faucet may operate over long periods of time without wear of the respective parts.

Further in accordance with the invention, replacement of the valve element 32 can be accomplished without shutting off the water in the main line, which is an exceptional advantage as will readily be understood. Thus by maintaining the lever 45 in a lowermost position, the valve element 38 is brought into closing relation with the valve seat of the valve seat insert 34, and the water thereby prevented from passing through the valve seats inserts to the outlet. Thus by simple removal of the cup 44 and unscrewing of the wing nut 43, the valve member 32 can be replaced without interference from any fluid flow.

A further advantage lies in the ability to have a two-way control of the flow, by means of the two valve members or elements 32 and 38.

It is also within the compass of the present invention to provide a plurality of settings for the faucet so that the valve element 32 may be disposed axially in a variety of spaced relations to the valve seat 33. This may be readily accomplished by a stepped construction for the extension 55 such as to bring the stop 58 into successive engaged positions axially.

It will be appreciated also that the individual fittings 11 and 12 may be readily interchanged by removal of the cover portions or bosses 19 and 20 so that either side thereof may be engaged with a corresponding section of the fitting 17, although it is also within the scope of the invention to provide an integral connection between the said valve or faucet members 11 and 12 and a fitting such as the fitting 17. Further, only one faucet may be used in a particular application, as will be obvious to those skilled in the art.

There has thus been provided a faucet which is exceptionally simple, attractive, rugged and efficient, and may be used in a wide range of domestic or industrial applications with minimum upkeep and care needed. For example, replacement of the valve element is readily accomplished simply by unscrewing the cup element, and replacement is correspondingly easy.

Thus there is no limitation on the uses for the faucet of the invention, although it has been described in relation to a domestic type of construction.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A faucet comprising a valve body having a passage therethrough, a valve stem reciprocable in said valve body and having a pair of valves spaced apart thereon, a pair of valve seats in said passage alternatively and selectively engageable with the valves, an inlet above one of the valve seats, an outlet below the other of the valve seats, means urging the valve for the other of the valve seats into closing relation therewith, a lever at the end of said valve stem opposite said valves, a slot in said end of said valve stem, a boss in said lever received in said slot, means on the body fulcruming one end of the lever, the other end of the lever being selectively depressible to operate the valves, said means urging the valve for the other valve seat into the closing relation therewith including a spring, a cup shaped member threaded on a valve body, a bearing retainer for the valve for the other valve seat and a wing nut threaded on the valve stem to maintain the bearing retainer against the said valve for the other valve seat, the boss on the lever and the slot in the valve stem coacting as a screw driver to prevent angular rotation on the valve stem during release of the wing nut upon removal of the cup shaped member for ready assembly and disassembly of the faucet.

2. A faucet comprising a body with an opening therethrough, a pair of valve seats in said opening, said casing having inlet and outlet openings communicating with the body opening respectively upstream and downstream of said valve seats, a valve stem carrying a pair of valves spaced for selective alternative engagement with said valve seats, one of said valves being removable from said stem, manually removable means retaining said removable valve on said stem, resilient means urging said removable valve into engagement with its seat, manually depressible means to actuate said valve stem against the action of said resilient means to open both valves, and lock means to hold said depressible means against the action of said resilient means with both valves in open position, said depressible means being further movable against the action of said resilient means and overriding said lock means to effect closure of the other valve and prevent flow through said body while the removable valve is removed and replaced.

3. A faucet comprising a body with an opening therethrough, a pair of valve seats in said opening, said casing having inlet and outlet openings communicating with the body opening respectively upstream and downstream of said valve seats, a valve stem carrying a pair of valves spaced for selected alternative engagement with said valve seats, one of said valves being removable from said stem manually rotatably removable means retaining said removable valve on said stem, resilient means urging said removable valve into engagement with its seat, manually pushable means to actuate said valve stem and move the same against the action of said resilient means to a position where the removable valve opens and the other valve also is open, said pushable means being movable further to close the other valve, and interlocking means between said pushable means and said valve stem to hold the latter against rotation to permit the easy removal of said manually removable means and permit removal and replacement of the removable valve while the other valve blocks flow through said body.

References Cited by the Examiner

UNITED STATES PATENTS

| | | | |
|---|---|---|---|
| 1,017,492 | 2/12 | Arthur | 137—614.14 |
| 1,301,577 | 4/19 | LaValley | 251—66 |
| 1,577,242 | 2/26 | Andersen | 137—242 X |
| 1,656,375 | 1/28 | Harris | 251—360 X |
| 1,819,571 | 8/31 | Porter | 137—614.14 |
| 2,339,666 | 1/44 | Anderson | 74—527 |
| 2,595,350 | 5/52 | Franck | 251—239 |
| 2,658,410 | 11/53 | Livers | 74—527 |
| 2,715,908 | 8/55 | Huthsing | 251—239 X |
| 3,075,541 | 1/63 | Hajek | 137—614.13 X |

ISADOR WEIL, *Primary Examiner.*